United States Patent
Park

(10) Patent No.: US 6,640,745 B1
(45) Date of Patent: Nov. 4, 2003

(54) BIRD FEEDER

(76) Inventor: Hong Ku Park, 203 Southcrest Dr., Huntsville, AL (US) 35802

( * ) Notice: Subject to any disclaimer, the term of this patent is extended or adjusted under 35 U.S.C. 154(b) by 0 days.

(21) Appl. No.: 10/131,547

(22) Filed: Apr. 24, 2002

(51) Int. Cl.[7] .............................................. A01K 61/02
(52) U.S. Cl. ..................................... 119/52.2; 119/57.8
(58) Field of Search ........................... 119/57.8, 57.9, 119/52.1, 52.2, 52.4, 53, 429, 432, 469, 61

(56) References Cited

U.S. PATENT DOCUMENTS

| | | |
|---|---|---|
| 2,464,644 A | 3/1949 | Kwash |
| 2,667,858 A | 2/1954 | Cussotti |
| 2,804,844 A * | 9/1957 | Gigliotti ....................... 119/53 |
| 4,664,066 A * | 5/1987 | Steuernagel et al. ....... 119/52.2 |
| 4,691,665 A | 9/1987 | Hefner |
| 4,732,112 A | 3/1988 | Fenner et al. |
| 5,062,388 A * | 11/1991 | Kilham ....................... 119/52.2 |
| 5,095,847 A | 3/1992 | Coffer |
| 5,195,463 A * | 3/1993 | Lorenzana ..................... 119/77 |
| 5,634,429 A * | 6/1997 | Loomis et al. .............. 119/52.2 |
| 5,718,187 A * | 2/1998 | Pollock et al. .............. 119/52.4 |
| 5,775,257 A * | 7/1998 | Park ............................ 119/57.8 |
| 5,884,581 A * | 3/1999 | Vandaele ..................... 119/52.4 |
| 6,155,205 A * | 12/2000 | Coates ........................ 119/57.9 |
| 6,349,672 B1 * | 2/2002 | Daffi .......................... 119/52.1 |

FOREIGN PATENT DOCUMENTS

| | | | |
|---|---|---|---|
| DE | 3149939 | * | 6/1983 |
| GB | 948716 | * | 2/1964 |
| WO | WO 84/02056 | * | 6/1984 |

* cited by examiner

*Primary Examiner*—Peter M. Poon
*Assistant Examiner*—David Parsley

(57) ABSTRACT

A bird feeding device comprising a hollow dome-shaped container for holding food; a food dispensing tray for closing the bottom of the dome-shaped container and dispensing and holding food; a closure with a suspending chain or rope for closing the top of the dome-shaped container.

12 Claims, 5 Drawing Sheets

BIRD FEEDER

BACKGROUND OF THE INVENTION

The present invention relates to the field of devices for feeding animals, and more particularly to devices which are hung on a tree or supported on a pole for feeding relatively small birds, such as finches, chickadees, blue birds etc. without waste of the feed.

While the prior art encompasses numerous devices for automatically dispensing feed to fowl, such devices have numerous defects and disadvantages which are obviated by the present invention. The following United States patents are exemplary of such prior art devices: U.S. Pat. No. 2,464,644 to Kwosh; U.S. Pat. No. 2,667,858 to Cussotti; U.S. Pat. No. 2,804,844 to Gigliotti; U.S. Pat. No. 4,691,665 to Hefner; U.S. Pat. No. 4,732,112 to Fenner et al.; U.S. Pat. No. 5,062,388 to Kilham; U.S. Pat. No. 5,095,847 to Coffer; and U.S. Pat. No. 5,775,257 to Park. All prior art devices above involved too many parts, and the process of the assembly and disassembly during cleaning and/or repair is complicated and hard. Some of them also require tools to be assembled and disassembled.

The present invention overcomes these deficiencies and disadvantages in that it provides a new and improved bird feeder that involves less parts and can be easily and quickly assembled and disassembled without any tools.

SUMMARY OF THE INVENTION

The present invention provides an animal feeding device that is particularly usable for feeding birds and which includes a container which defines a food reservoir for holding food to be automatically dispensed therefrom.

The animal feeding device preferably comprises three basic components, namely, a hollow dome-shaped container for holding food; a food dispensing tray for dispensing and holding food comprising a peripheral skirt and a central portion with a plurality of food dispensing channels around that extends upwardly from the tray into the lower extremity of the hollow dome-shaped container so as to close off the bottom of the hollow dome-shaped container and to provide a plurality of food dispensing openings; and a chain or rope for supporting or suspending the feeding device.

It is a primary object of the present invention to provide a bird feeder device wherein less component parts are involved than other general type of bird feeders, and the essential component parts are simplified and are easily and quickly assembled, disassembled, and replaced without using any tool.

It is a further object of the present invention to provide a bird feeder device which dispenses food automatically without undue waste and can be inexpensively constructed mostly from beverage containers which are normally disposed of as solid waste.

These objects as well as other objects of the present invention will become more readily apparent after reading the following description in conjunction with the accompanying drawings and claims.

DETAILED DESCRIPTION OF THE PREFERRED EMBODIMENT

Figure 1:
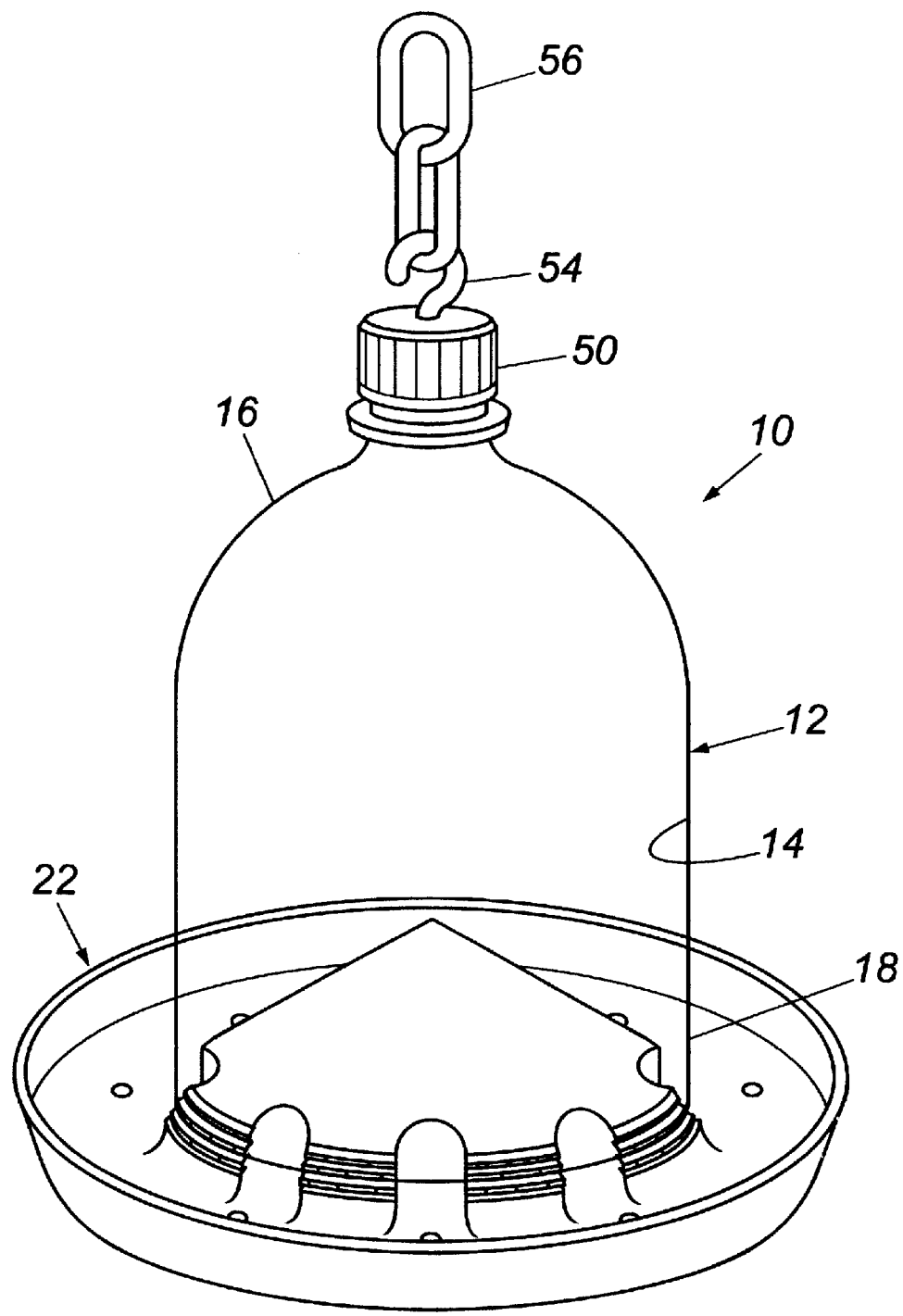
FIG. 1 is perspective view of the bird feeder of the present invention.
Figure 2:
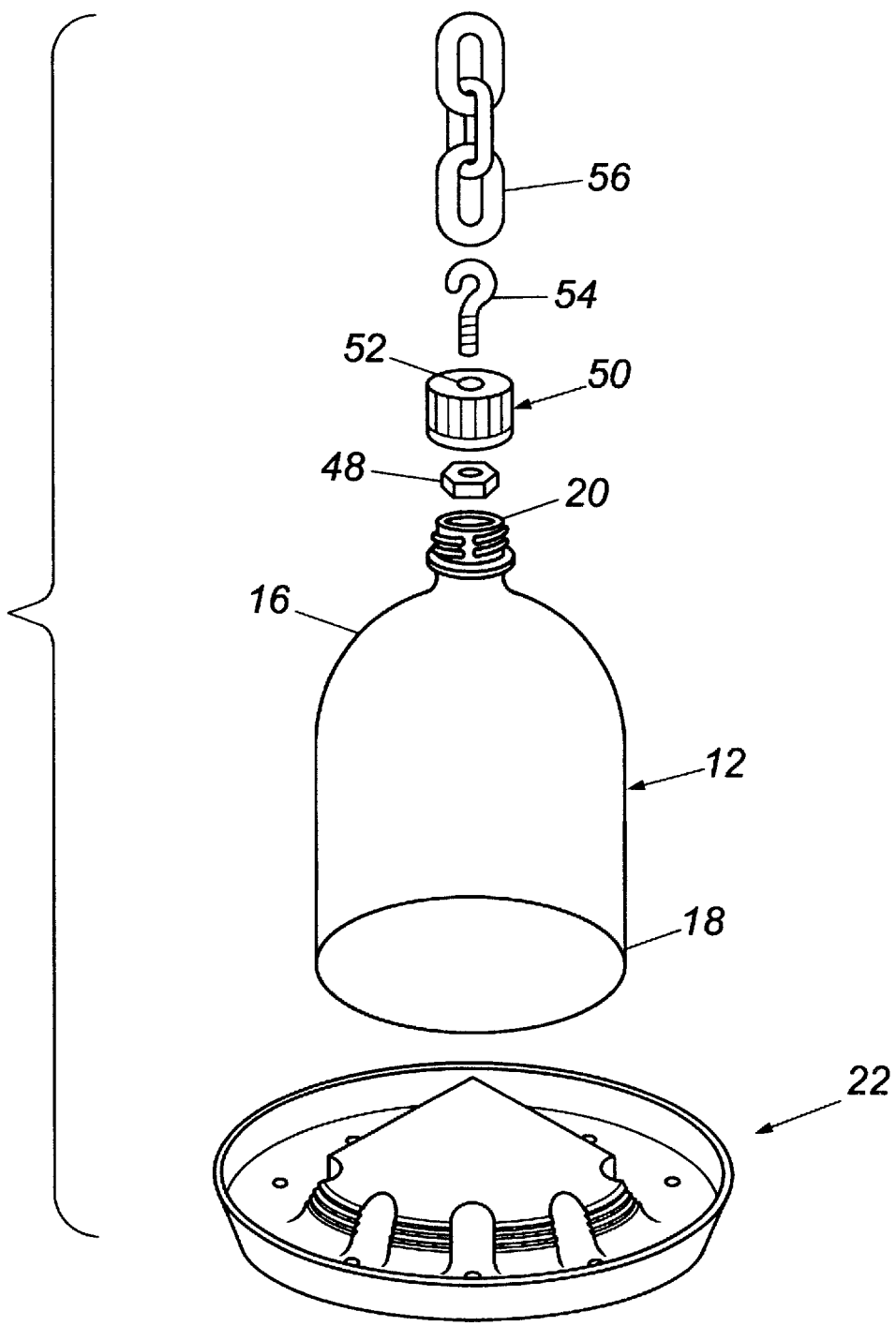
FIG. 2 is a is a front elevational, exploded, view of the bird feeder of the present invention.

Referring to drawings, particularly FIGS. 1 and 2 thereof, reference numeral 10 generally designates the preferred embodiment of the bird feeder of the present invention. Still referring to FIG. 1 and 2, bird feeder 10 generally comprises a hollow dome-shaped container 12, a food dispensing tray 22, an internally threaded nut 48, an externally threaded eyebolt 54, a cap 50, and a chain or rope 56.

As still best seen in FIGS. 1 and 2, a hollow container 12 includes an inner wall 14; an upper section 16 having an opening 20 surrounded by external threads (not numbered); and a lower section 18.

Figure 5:
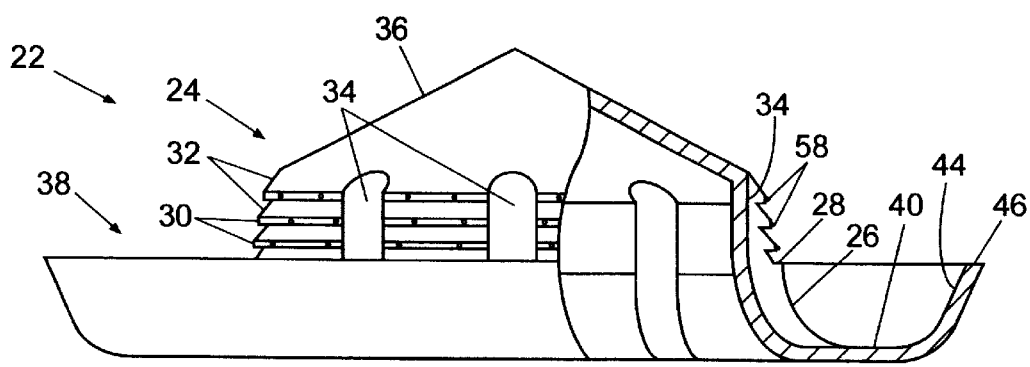
FIG. 5 is a partial cross-sectional, generally side view showing the details of the food dispensing tray including the plurality of grippers for maintaining the tray within the lower portion of the reservoir.
Figure 6:
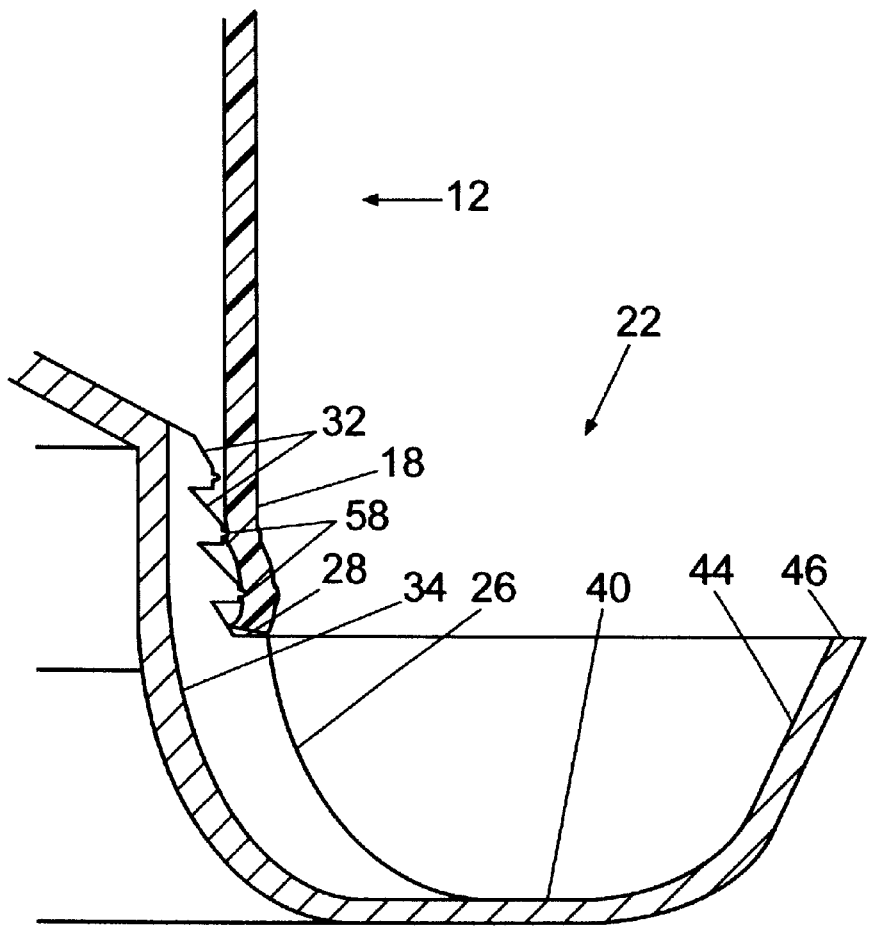
FIG. 6 is a close-up, cross-sectional view showing the intersection of the reservoir and the plurality of grippers as depicted in FIG. 3.

As best seen in FIGS. 5 and 6, a food dispensing tray 22 includes a lower tray section 38 having a peripheral skirt 40 with a plurality of small openings 42 and an upwardly extending marginal wall 44; and an upwardly extending central section 24 having a plurality of food dispensing channels 34, a lower annular portion 26 with a marginal shoulder 28 therein, a plurality of ribs 30 and valleys 32, and a conically-shaped top portion 36.

Figure 3:
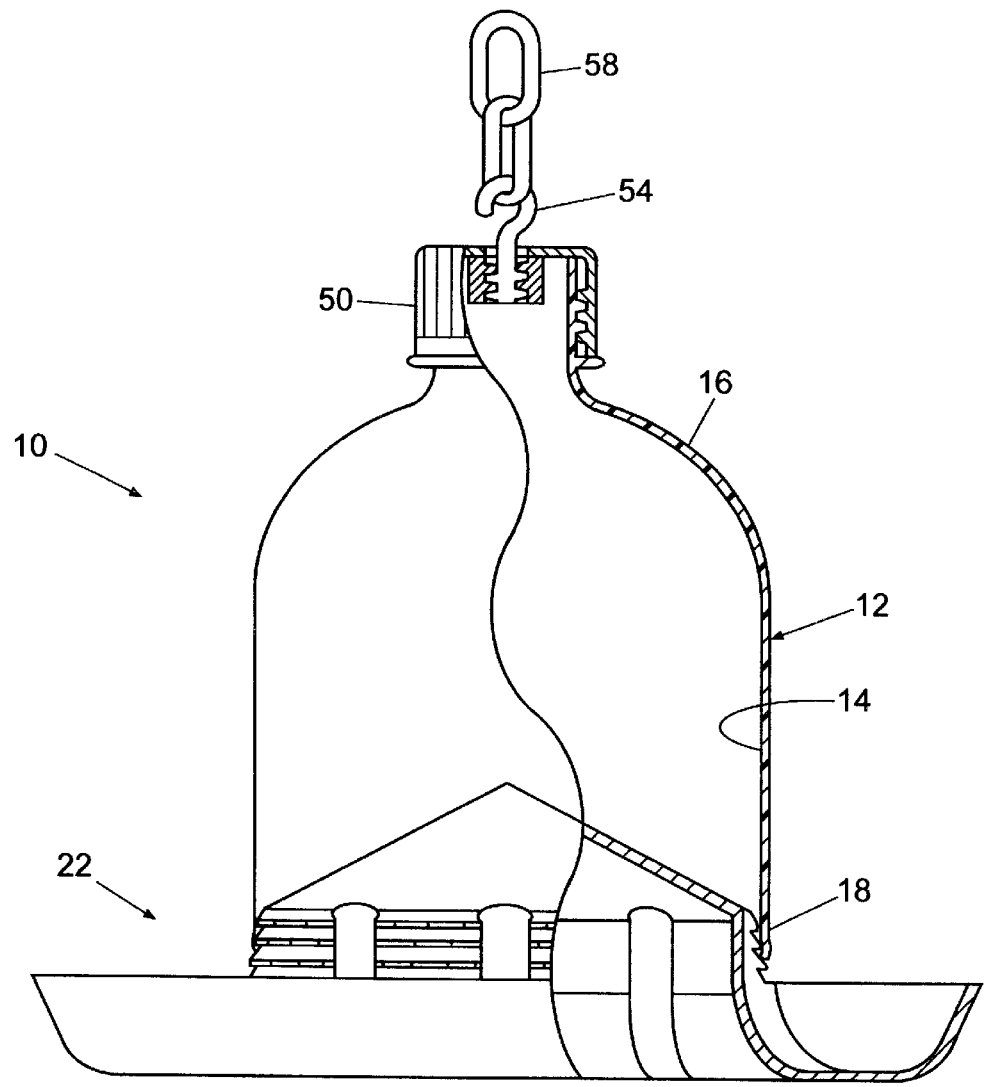
FIG. 3 is a front elevational, partially broken away and in section, view showing the mating of the hollow dome-shaped container, the food dispensing tray, and a supporting or suspending device.
Figure 4:
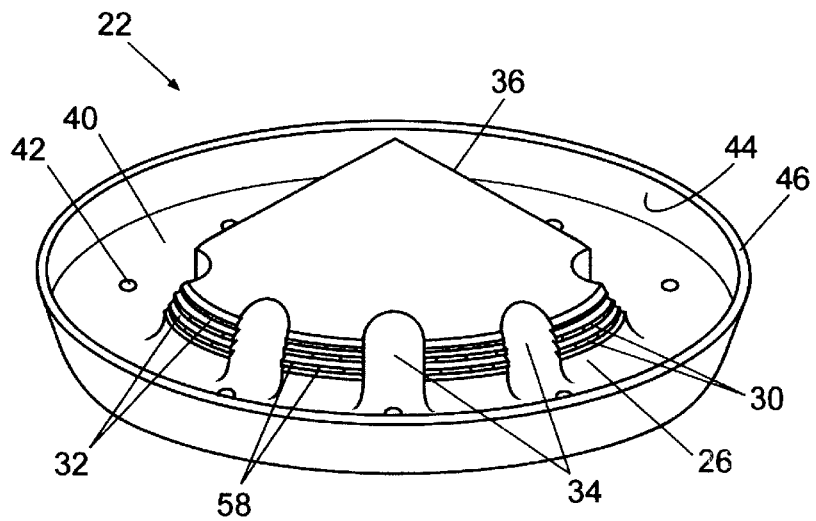
FIG. 4 is a partially enlarged view of the FIG. 3.

The components of bird feeder 10 are best assembled from its exploded, separated, condition as shown in FIG. 2 to its assembled, joined, condition as shown in FIGS. 1 and 3 in the following order:

a. First, the upwardly extending central section 24 of the food dispensing tray 22 is inserted within the lower section 18 of the container 12 until the edge (not numbered) of the lower section 18 engages one of the valleys 32 or the shoulder 28 of the food dispensing tray 22 so that at least one rib 30 of the food dispensing tray 22 secure the lower section 18 to the central section 24 of food dispensing tray 22.

b. The container 12 is filled with seed by pouring the same through the opening 20 of the container 12 with the seed being spread outwardly toward the food dispensing channels 34 of the food dispensing tray 22 due to the generally conical shape of the top portion 36 of the food dispensing tray 22.

c. The threaded eyebolt 54 is inserted through the central opening 52 in the cap 50, and the threaded nut 48 is threadedly engaged with the threads on eyebolt 54 to secure the cap 50 to eyebolt 54.

d. The eyebolt 54 is then engaged to chain or rope 56 for suspension of the bird feeder 10 from a tree limb or a standard.

When assembled as shown in FIG. 1 and with bird feed within the container 12, the combination of gravity and the conically-shaped top 36 of the food dispensing tray 22 forces the feed out toward the food dispensing channels 34 of the food dispensing tray 22 so that the feed goes down through the food dispensing channels 34 to the peripheral skirt 40 of the food dispensing tray 22 and birds standing on the edge 46 of the wall 44 of the tray 22 can peck the feed. The small openings 42 provide the passage for rain water.

It has been found that the container 12 and the food dispensing tray 22 of the bird feeder 10 can be held together by friction fit. Each rib 30 of the food dispensing tray 22 is raised higher than the rib 30 directly above so that at least one of the ribs 30 can secure the lower station 18 of the container 12 of varying internal dimensions to the central section 24 of the food dispensing tray 22. It has also found that the container 12 can be made of any used plastic bottle or container, such as soft drink bottles and peanuts butter containers.

While a particular embodiment of this invention has been shown in the drawings and described above, it will be appreciated that the invention is susceptible to modifications, variations, and adaptations without departing from the proper scope and fair meaning of the accompanying claims.

What I claim as my invention is:

1. A bird feeder comprising:
   a reservoir inducing an upper section with a central opening therein and a closure means for closing said central opening and an open-ended lower section;
   an external food dispensing tray capable of maintaining a frictional fit within said open lower section of said reservoir, wherein said food dispensing tray further includes an upwardly extending central section having an annular base portion with a shoulder, a tapered annular mid portion with a plurality of grippers, and a conical-shaped upper portion;
   wherein said food dispensing tray includes a generally flat closed bottom having a diameter greater than that of said reservoir and an upwardly extending outer annular wall; and
   wherein said plurality of grippers comprise a series of annular ridges and valleys located about said tapered annular mid portion of said upwardly extending central section and wherein said grippers enable said friction fit between said tapered annular mid portion and said open-ended lower section of said reservoir.

2. A bird feeder as set forth in claim 1, wherein said generally closed flat bottom of said food dispensing tray further comprises a plurality of openings to allow for the removal of rain water therefrom.

3. A bird feeder as set forth in claim 1, wherein said upwardly extending central section includes a plurality of food dispensing channels about its outer periphery for communicating food from said reservoir to said food dispensing tray.

4. A bird feeder as set forth in claim 1, wherein said annular ridges include an upper and lower surface and said upper and lower surfaces intersect to form a sharp edge for gripping the interior surface of the open-ended lower section of the reservoir.

5. A bird feeder as set forth in claim 1, wherein said reservoir is made of a portion of a beverage container.

6. A bird feeder comprising:
   an open-ended reservoir with a central upper opening therein and a closure means for closing said central upper opening;
   an external food dispensing tray capable of maintaining a frictional fit within said open-ended reservoir, wherein said food dispensing tray further includes an upwardly extending central section for insertion within said open-ended reservoir, wherein said central section includes a tapered annular portion with a plurality of grippers, said grippers capable of maintaining said friction fit with an internal surface of said reservoir;
   wherein said food dispensing tray includes a generally flat closed bottom having a diameter greater than that of said reservoir; and
   wherein said plurality of grippers comprise a series of annular ridges and valleys located about said tapered annular portion of said upwardly extending central section.

7. A bird feeder as set forth in claim 6, wherein said generally closed flat bottom of said food dispensing tray further comprises a plurality of openings to allow for the removal of rain water therefrom.

8. A bird feeder as set forth in claim 6, wherein said upwardly extending central section includes a plurality of food dispensing channels about its outer periphery for communicating food from said reservoir to said food dispensing tray.

9. A bird feeder as set forth in claim 6, wherein said annular ridges include an upper and lower surface and said upper and lower surfaces intersect to form a sharp edge for gripping the interior surface of the open-ended reservoir.

10. A bird feeder as set forth in claim 8, wherein said upwardly extending central section further comprises:
    an annular base portion with a shoulder; and
    a conical-shaped upper portion.

11. A bird feeder comprising:
    a reservoir including an upper section with a central opening therein and a closure means for closing said central opening and an opera-ended lower section;
    an external food dispensing tray capable of maintaining a frictional fit within said open lower section of said reservoir, wherein said food dispensing tray further includes a tapered annular portion with a plurality of grippers and a conical-shaped upper portion;
    wherein said food dispensing tray includes a generally flat closed bottom having a diameter greater than that of said reservoir and an upwardly extending outer annular wall; and
    wherein said plurality of grippers comprise a series of annular ridges and valleys located about said tapered annular portion for maintaining a friction fit between said external food dispensing tray and an interior surface of said open-ended lower section of said reservoir.

12. A bird feeder as set forth in claim 11, wherein said tapered annular portion includes a plurality of food dispensing channels about its outer periphery for communicating food from said reservoir to said food dispensing tray.

* * * * *